United States Patent
Libsch et al.

(10) Patent No.: US 12,474,250 B2
(45) Date of Patent: Nov. 18, 2025

(54) LINEAR FLUIDIC CELL TRAP DEVICE FOR SINGLE CELL DETECTION

(71) Applicant: International Business Machines Corporation, Armonk, NY (US)

(72) Inventors: Frank Robert Libsch, White Plains, NY (US); Venkat K. Balagurusamy, Airmont, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 18/341,884

(22) Filed: Jun. 27, 2023

(65) Prior Publication Data

US 2025/0003855 A1    Jan. 2, 2025

(51) Int. Cl.
| | |
|---|---|
| *G01N 15/06* | (2024.01) |
| *B01L 3/00* | (2006.01) |
| *G06N 3/08* | (2023.01) |
| *G01N 15/01* | (2024.01) |

(52) U.S. Cl.
CPC .... *G01N 15/0656* (2013.01); *B01L 3/502715* (2013.01); *G06N 3/08* (2013.01); *B01L 2300/0645* (2013.01); *B01L 2300/0877* (2013.01); *G01N 15/01* (2024.01)

(58) Field of Classification Search
CPC ...... G01N 15/0656; G01N 15/01; G06N 3/08; B01L 2300/0877; B01L 2300/0645; B01L 3/502715; G01R 33/00; G01R 33/0035; G01R 33/0023; G01R 33/0017; G01R 31/3191; G01B 7/004; G01C 17/38; G06F 3/017; G06F 3/0346; G06F 3/012
See application file for complete search history.

(56) References Cited

U.S. PATENT DOCUMENTS

| | | | |
|---|---|---|---|
| 6,169,394 B1* | 1/2001 | Frazier | G01N 27/44791 |
| | | | 324/692 |
| 6,749,736 B1 | 6/2004 | Fuhr et al. | |
| 8,367,018 B2 | 2/2013 | Chuang et al. | |

(Continued)

FOREIGN PATENT DOCUMENTS

| | | |
|---|---|---|
| CN | 103923825 A | 7/2014 |
| CN | 112986342 B | 12/2022 |

(Continued)

OTHER PUBLICATIONS

International Search Report and Written Opinion; Mailed: Sep. 10, 2024; Application No. PCT/IB2024/054861; Filed: May 19, 2024; 12 pages.

(Continued)

*Primary Examiner* — Lee E Rodak
*Assistant Examiner* — Taqi R Nasir
(74) *Attorney, Agent, or Firm* — Cantor Colburn LLP; Smauel Waldbaum

(57) ABSTRACT

A sensing structure is provided and includes a tubular element through which a fluid is flowable along a single path, an array of sensors disposed along a length of the tubular element whereby the fluid is flowable through each of the sensors and sensing circuitry electrically connected with each of the sensors and configured to measure a reactance of each of the sensors and to determine whether any reactance is indicative of a presence of a biological cell in the fluid flowing through the corresponding sensors.

20 Claims, 7 Drawing Sheets

(56) References Cited

U.S. PATENT DOCUMENTS

| | | | |
|---|---|---|---|
| 8,614,707 | B2 | 12/2013 | Warsito et al. |
| 9,149,806 | B2 | 10/2015 | Collins |
| 9,261,474 | B2 * | 2/2016 | Potyrailo ............. G01N 27/026 |
| 9,994,839 | B2 | 6/2018 | Lo et al. |
| 10,746,685 | B2 | 8/2020 | Marashdeh et al. |
| 10,806,366 | B2 | 10/2020 | Marashdeh et al. |
| 11,092,564 | B2 | 8/2021 | Marashdeh et al. |
| 11,440,007 | B2 | 9/2022 | Watkins et al. |
| 2007/0139451 | A1 | 6/2007 | Somasiri et al. |
| 2013/0085365 | A1 | 4/2013 | Marashdeh et al. |
| 2016/0370278 | A1 * | 12/2016 | Muir ...................... G01N 33/48 |
| 2018/0120294 | A1 | 5/2018 | Collins |
| 2020/0407677 | A1 * | 12/2020 | Beaty ............... G01N 33/48785 |
| 2021/0379594 | A1 | 12/2021 | Gong et al. |
| 2022/0187184 | A1 * | 6/2022 | Al ..................... B01L 3/502707 |
| 2022/0314216 | A1 | 10/2022 | Fan et al. |

FOREIGN PATENT DOCUMENTS

| | | |
|---|---|---|
| WO | 2012162779 A1 | 12/2012 |
| WO | 2022112474 A1 | 6/2022 |

OTHER PUBLICATIONS

Daza et al. "Monitoring living cell assays with bio-impedance sensors." Sensors and Actuators B: Chemical 176 (2013): 605-610.

Huang et al., "Investigation of the Effects of Electrode Geometry on the Performance of C4D Sensor with Radial Configuration", Sensors, 21.13 (2021), p. 1-16.

Igreja et al., "Analytical evaluation of the interdigital electrodes capacitance for a multi-layered structure." Sensors and Actuators A: Physical 112.2-3 (2004): 291-301.

King et al., "Microfluidic flow-encoded switching for parallel control of dynamic cellular microenvironments," The Royal Society of Chemistry, Lab Chip, 2008, pp. 107-116.

Tang et al., "New Contactless Conductivity Detection (CCD) Sensor for Fluid Conductivity Measurement," IEEE Sensors Journal, 20.19 (2020):, pp. 1-10.

Turolla et al. "Development of a miniaturized and selective impedance sensor for real-time slime monitoring in pipes and tanks." Sensors And Actuators B: Chemical 281 (2019): 288-295.

Yeo et al., "Microfluidic Devices for Bioapplications," Biomicrofluidics, Small, 2011, pp. 12-48.

* cited by examiner

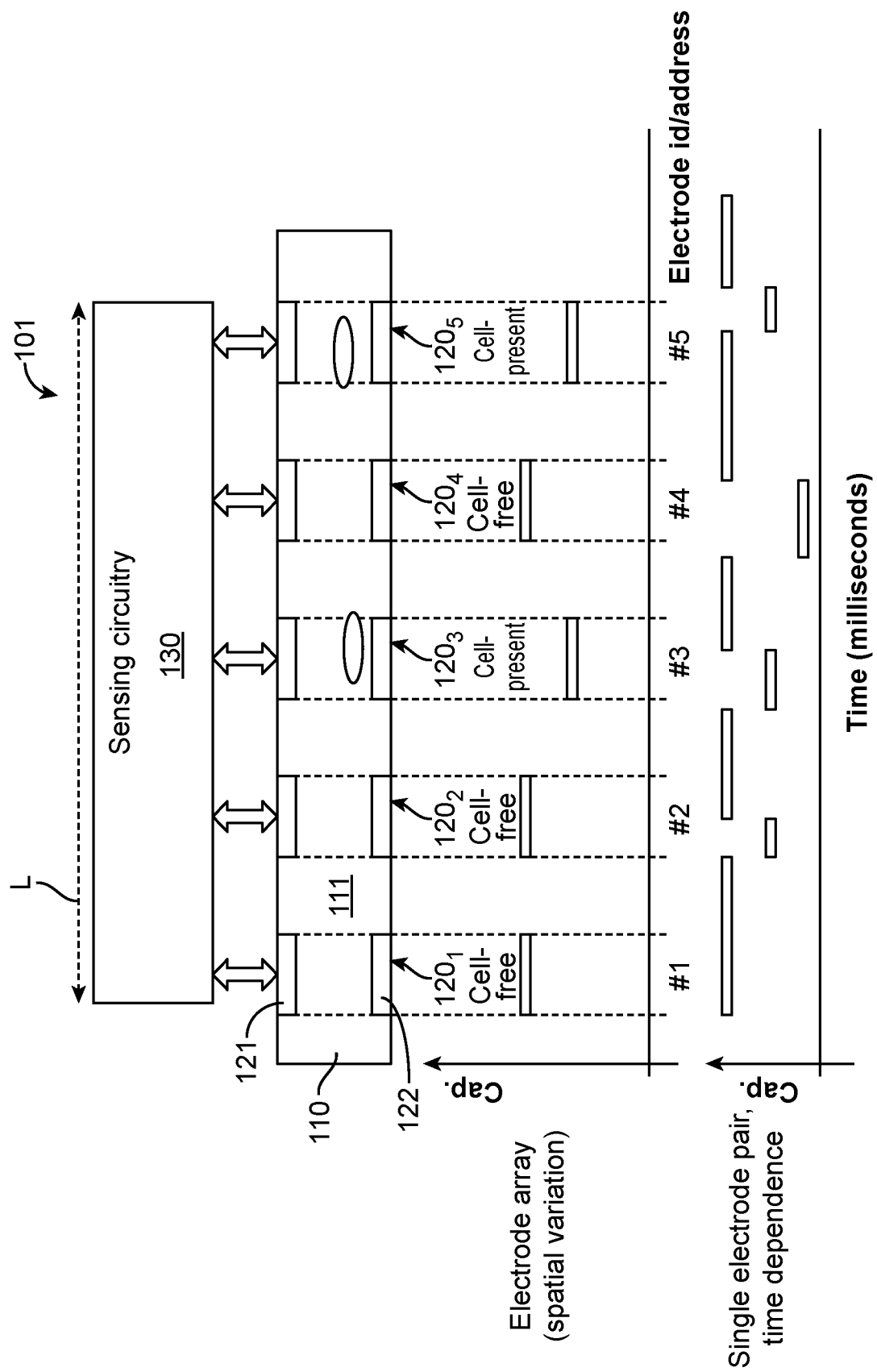

- 1 level planar metal (steps 1-6)
- Planarized
- Handler attached
- Wafer thinned Bonding (low temp)

LINEAR FLUIDIC CELL TRAP DEVICE FOR SINGLE CELL DETECTION

BACKGROUND

The present invention generally relates to detecting systems. More specifically, the present invention relates to a linear fluidic cell trap device for single cell detection.

Single cells represent a fundamental biological unit. Unfortunately, biological knowledge has been generally obtained by the study of large cell populations due to the availability of simple, quick-to-use, inexpensive instrumentation and/or the ease of sample preparation. There remain fundamental and applied questions, however, such as those relating to transcriptional control of stem cell differentiation, intrinsic noise in gene expression and the origins of disease that can only be addressed at the single cell level.

Also, identifying a single bacterial cell or a virus particle is of great significance for identifying food or produce contamination and for individual health monitoring, respectively. Identifying a single bacterial cell can help to identify pathogenic bacteria contamination in food or produce. Identifying a virus particle can help to determine whether a sick individual is infected with Covid or a common flu virus preferably at home without having to make a visit to a diagnostic laboratory or to a doctor's office.

SUMMARY

Embodiments of the invention are directed to a sensing structure. A non-limiting example of the sensing structure is provided and includes a tubular element through which a fluid is flowable along a single path, an array of sensors disposed along a length of the tubular element whereby the fluid is flowable through each of the sensors and sensing circuitry electrically connected with each of the sensors and configured to measure a reactance of each of the sensors and to determine whether any reactance is indicative of a presence of a biological cell in the fluid flowing through the corresponding sensors.

Embodiments of the present invention are directed to a sensing structure. A non-limiting example of the sensing structure includes a bottom wafer, a top wafer, insulator layers interposed between the bottom wafer and the top wafer and formed to define a channel along which fluid is flowable along a single path, sensors disposed along a length of the channel whereby the fluid is flowable through each of the sensors and sensing circuitry electrically connected with each of the sensors and configured to measure at least one of capacitances and inductances of each of the sensors and to determine whether any of the at least one of the capacitances and the inductances indicate a presence of a biological cell in the fluid flowing through the corresponding sensors.

Embodiments of the present invention are directed to a method of operating a sensing structure for sensing a biological cell in a fluid. A non-limiting example of the method includes arranging sensors in an array along a single path, obtaining a baseline reactance of each of the sensors, flowing the fluid through the sensors in the array and along the single path, obtaining a testing reactance of each of the sensors during the flowing of the fluid and determining whether a difference between the baseline reactance and the testing reactance of each of the sensors exists and is indicative of a presence of the biological cell.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1A is a side view of a sensing structure and graphics illustrating an operation of the sensing structure in accordance with one or more embodiments of the present invention;

Figure 1B:
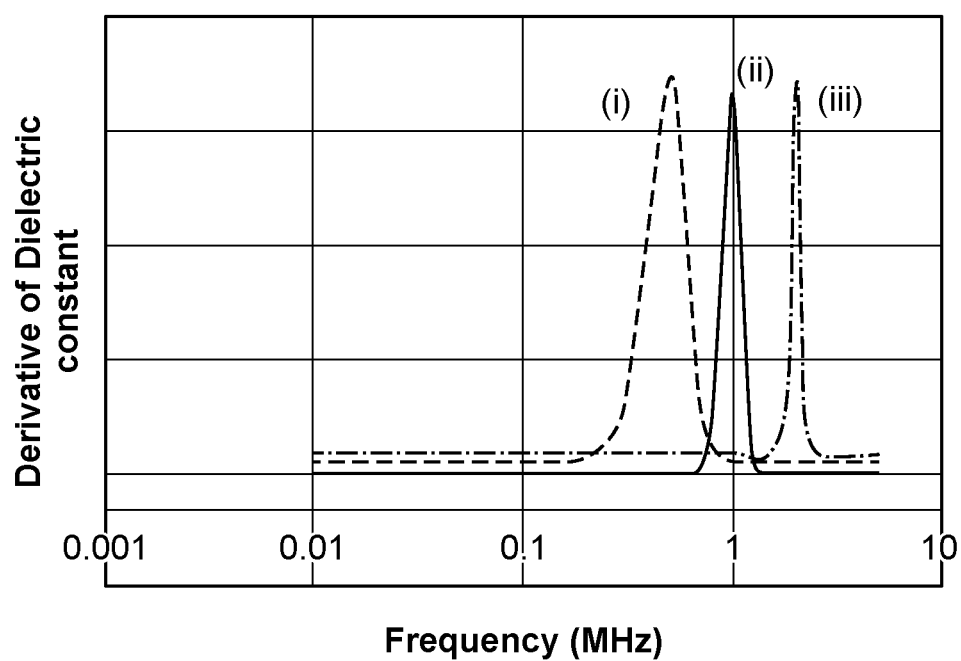
FIG. 1B is a graphical illustration of readings from sensing circuitry of the sensing structure of FIG. 1A in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, existing methods for measuring transcript levels in single cells include quantitative reverse transcription polymerase chain reaction (RT-qPCR), single molecule counting using digital PCR, hydridization probes and next generation sequencing. Of these, single cell RT-qPCR provides combined advantages of sensitivity, specificity and dynamic range, but a major disadvantage is low throughput, high reagent cost and difficulties in accurately measuring low abundance transcripts.

Turning now to an overview of the aspects of the invention, one or more embodiments of the invention address the above-described shortcomings of the prior art by providing for several (N) linearly connected single cell traps enabling higher throughput, which is determined by an assay flow rate and a sampling speed of a detector. Measurement accuracy increases due to separate current or voltage stimulus electrodes for each cell with separate isolated imbedded detection/measurement probes within the main path of the stimulus electrodes. In addition, a wafer-to-wafer parallel fabrication manufacturing method results in substantially lower cost.

The above-described aspects of the invention address the shortcomings of the prior art by providing a sensing structure that includes a tubular element through which a fluid is flowable along a single path, an array of sensors disposed along a length of the tubular element whereby the fluid is flowable through each of the sensors and sensing circuitry electrically connected with each of the sensors and configured to measure a reactance of each of the sensors and to determine whether any reactance is indicative of a presence of a biological cell in the fluid flowing through the corresponding sensors.

Turning now to a more detailed description of aspects of the present invention, FIG. 1A depicts a sensing structure 101 that includes a tubular element 110 through which a fluid is flowable along a single path 111, an array of sensors $120_1$ through $120_5$, denoted as $120_{1-5}$ disposed along a length L of the tubular element 110 whereby the fluid is flowable through each of the sensors $120_{1-5}$ as the fluid flows through the tubular element 110 and sensing circuitry 130. The sensing circuitry 130 is electrically connected with each of the sensors $120_{1-5}$ and is configured to measure a reactance of each of the sensors $120_{1-5}$ and to determine whether any reactance is indicative of a presence of a biological cell in the fluid flowing through the corresponding sensors $120_{1-5}$.

Each of the sensors $120_{1-5}$ includes opposed electrodes 121, 122 on opposite sides of the tubular element 110 at uniform and regular intervals along the length L. Although five groups of sensors $120_{1-5}$ are shown in FIG. 1A, the sensing structure 101 includes at least three or more of the sensors in the group of sensors $120_{1-5}$ to ensure that a statistically significant number of detection and identification events occur with a given run. It is to be understood that additional numbers of sensors besides sensors $120_{1-5}$ can be disposed along the length L.

The sensing circuitry 130 includes a processing unit, a memory unit and a networking or input/output (I/O) unit by which the processing unit is communicative with the group of sensors $120_{1-5}$ and with external devices. The memory unit has executable instructions stored thereon, which are readable and executable by the processing unit. When the executable instructions are read and executed by the processing unit, the executable instructions cause the processing unit and the sensing circuitry 130 in general to operate as described herein. Particularly, the sensing circuitry 130 is configured to measure at least one of capacitances and inductances across the array of the sensors $120_{1-5}$ and/or to measure at least one of a capacitance and an inductance of each one of the sensors $120_{1-5}$.

When the fluid is free from the biological cell and when the fluid has the biological cell, the sensing circuitry is controllable to obtain a dielectric constant of the fluid over a range of operating frequencies. In addition, the array of the sensors $120_{1-5}$ and the sensing circuitry 130 can be calibrated by obtaining the dielectric constant of the fluid over the range of operating frequencies for when the fluid has only one type of a biological cell.

That is, in an operation of the sensing structure 101, a baseline reactance of the sensors $120_{1-5}$ is obtained by measuring the reactance with no fluid being present in the tubular member 110. Subsequently, the dielectric constant of the fluid can be obtained by measuring the reactance with the fluid flowing through the tubular member 110 in a condition in which the fluid is known to be free of any biological cell. The sensing circuitry 130 in this case obtains the dielectric constant from a difference between the fluid-less reactance and the reactance of the fluid with the absence of the biological cell. At this point, once the dielectric constant of the fluid is known, the fluid is flown through tubular member 110 in a condition in which the biological cell may be present. The sensing circuitry 130 can identify the presence of the biological cell at any one of the sensors $120_{1-5}$ from changes in reactance as illustrated in the graphical elements of FIG. 1A.

With reference to FIG. 1B, the sensing circuitry can be used to generate readings that identify a type of biological cells detected by the sensing structure 101 as follows. The tubular element 110 is filled with fluid/buffer medium containing no biological cells (i.e., bacteria or virus) to make a background measurement. A capacitive or reactance measurement is then made over a range of frequencies (preferably 0.1 to 100 MHz) to extract the dielectric constant of the background medium. The fluid including biological cells (i.e., bacteria or virus or other biological material) is then passed through the tubular member 110 and a same type of frequency scan is repeated to obtain a new dielectric constant over the frequency range. The different peaks and peak half-widths in the dielectric dispersion curve of FIG. 1B would then show peaks and peak half-widths corresponding to the different types of biological cells. For calibrating the sensing structure 101 to achieve this, dielectric dispersion measurements would be performed with only one type of biological cells at a time. This process will be repeated with a different type of biological cells for each iteration. Neural network models will be trained with this data to identify the different types of biological cells.

Figure 2:
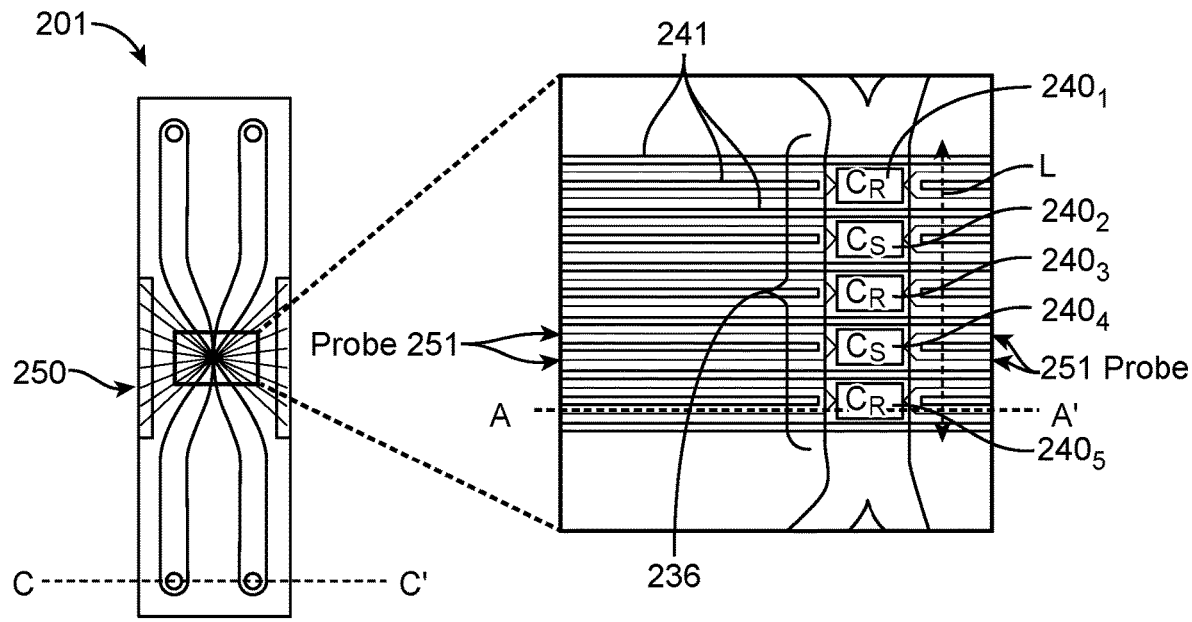
FIG. 2 is a schematic top-down diagram illustrating a sensing structure in accordance with one or more embodiments of the present invention.
Figure 3:
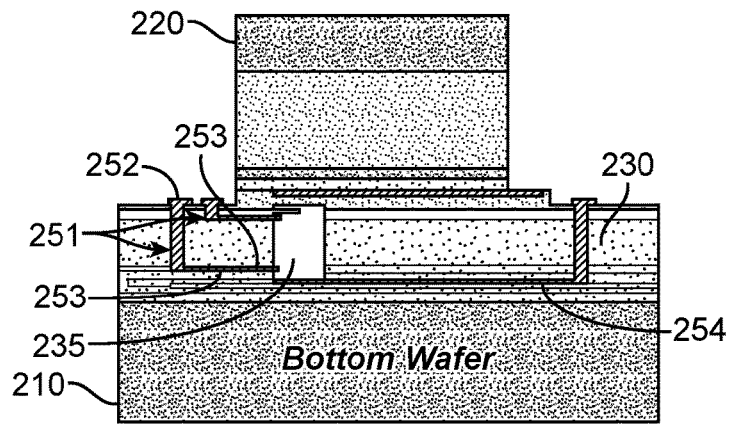
FIG. 3 is a side view of the sensing structure of FIG. 2 taken along line A-A' of FIG. 2 in accordance with one or more embodiments of the present invention.
Figure 4:
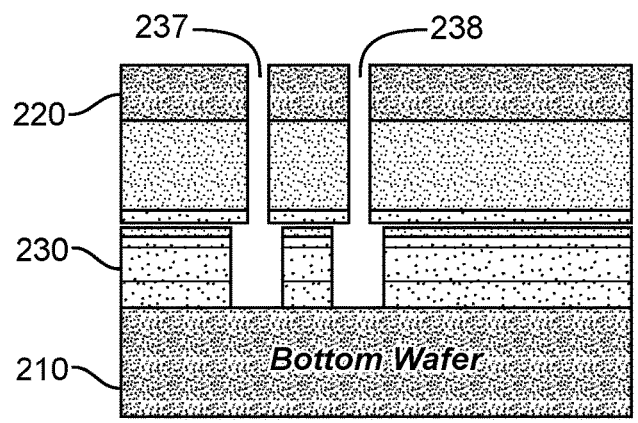
FIG. 4 is a side view of the sensing structure of FIG. 2 taken along line C-C' of FIG. 2 in accordance with one or more embodiments of the present invention.

With reference to FIGS. 2-4, a top view of a sensing structure 201 is provided and includes a bottom wafer 210, a top wafer 220, insulator layers 230, group of sensors $240_{1-5}$ and as shown here, IC integrated sensing circuitry 250. The insulator layers 230 are interposed between the bottom wafer 210 and the top wafer 220 and are formed to define a channel 235 along which fluid is flowable along a single path 236. The sensors $240_{1-5}$ are disposed along a length L of the channel 235 whereby the fluid is flowable through each of the sensors $240_{1-5}$ as the fluid flows through the channel 235. The sensing circuitry 250 is similarly configured as the sensing circuitry 130 of FIG. 1 and is electrically connected with each of the sensors $240_{1-5}$. The sensing circuitry 250 may be provided as integrated ICs as shown in FIG. 2 or as an external feature as shown in FIG. 1 and is configured to measure at least one of capacitances and inductances of each of the sensors $240_{1-5}$ and to determine whether any of the at least one of the capacitances and the inductances indicate a presence of a biological cell in the fluid flowing through the corresponding sensors $240_{1-5}$.

As shown in the enlarged image of FIG. 2, the sensors $240_{1-5}$ can include reference sensors ($C_R$) and sample sensors ($C_S$) interleaved with one another along the length L. In any case, each of the sensors $240_{1-5}$ can include a pair of ground-signal-ground (GSG) electrodes 241 on opposite sides of the channel 235.

The sensing circuitry 250 can include multiple (e.g., four) probes 251. Each probe 251 includes a pad 252 that is exposed to an exterior of the sensing structure 201, probe tips 253 disposed in electrical contact with corresponding ones of the reference sensors $C_R$ and the sample sensors $C_S$ and metallization 254 that extends through the insulator layers 230 between the corresponding pad 252 and each of the corresponding probe tips 253. In accordance with embodiments, the probe tips 253 of each probe 251 can be disposed in electrical contact with adjacent ones of the reference sensors $C_R$ and the sample sensors $C_S$ and pairs of probes 251 can have overlapping probe tips 253.

As shown in FIG. 3, the probe tips 253 of two of the probes 251 can be provided along a same sidewall of the channel 235 whereas the probe tips of two other probes 251 can be provided opposite one another on top and bottom walls of the channel 235. As an example, certain ones of the probe tips 253 (i.e., stimulus probes) can be disposed on the top and bottom walls of the channel 235 and other ones of the probe tips 253 (i.e., measurement sense probes) can be disposed along a same sidewall of the channel 235, or as labeled in FIG. 2 as "Probes 251" on the right side and left side, respectively, of the enlarged image of FIG. 2. In each case, as shown in the enlarged image of FIG. 2, the probe tips 253 can be displaced from one another along the length L in an alternating ground-probe-ground arrangement to avoid generating noise or otherwise affecting capacitance/inductance readings. In addition to helping noise immunity is the placement of the measurement sensing probes and contacts on the opposite side of the channel 235 from the stimulus probes.

FIG. 4 is the cross-section labeled C-C' in the non-enlarged image of FIG. 2 showing that the channel 235 may have at least two inlets 237, 238 by which fluid can be directed into the channel 235. This allows the sensing structure 201 to be initialized and calibrated (similarly as described above) as well as providing an exit port for trapped air or gas that would otherwise block desired microfluidic flow. That is, inlet 237 can be employed to direct fluid with a known absence of the biological cell into the channel 235 and inlet 238 can be used to direct fluid that can have a biological cell into the channel 235.

Figure 5:
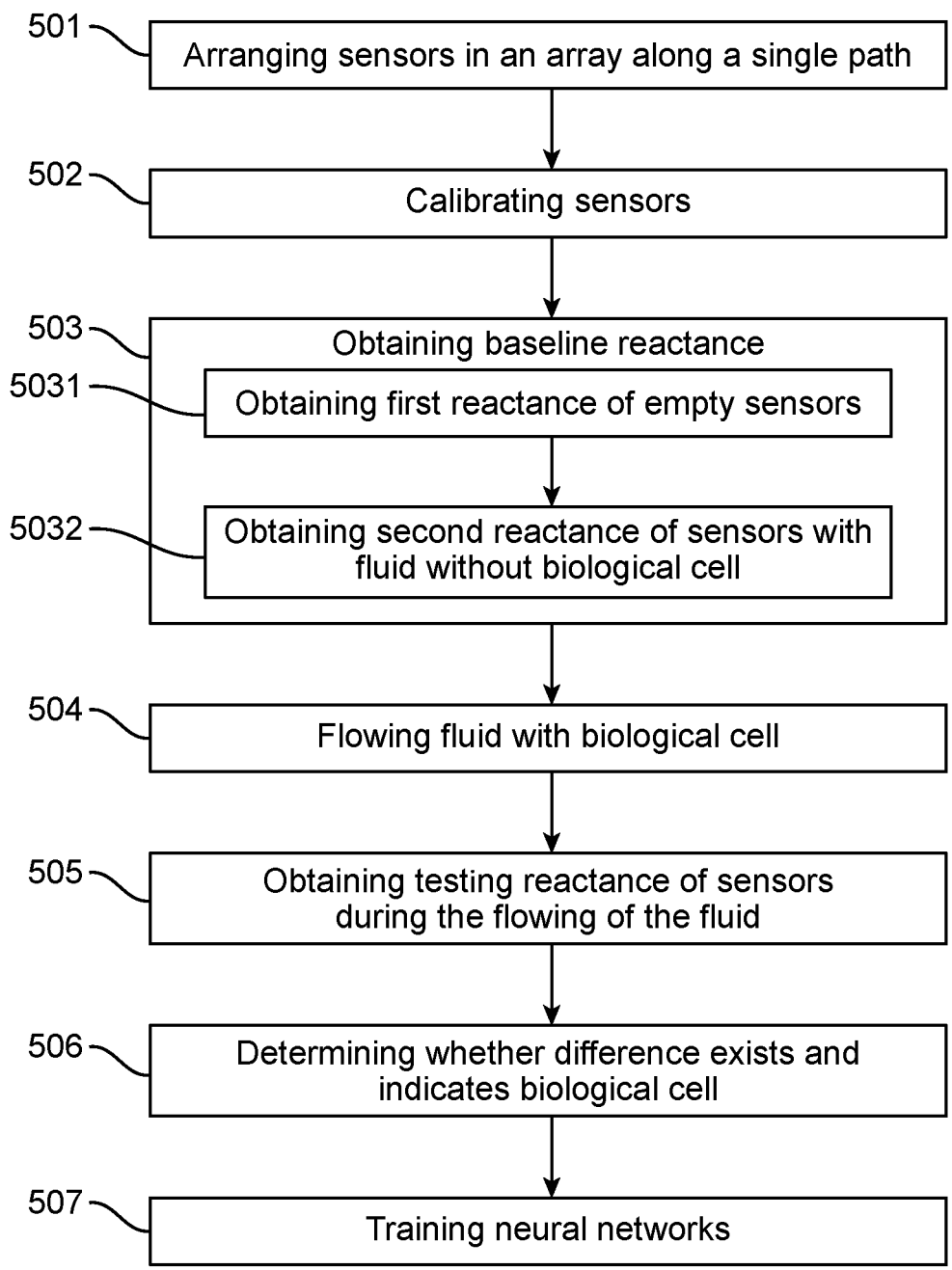
FIG. 5 is a flow diagram illustrating a method of operating a sensing structure for sensing a biological cell in a fluid in accordance with one or more embodiments of the present invention.

With reference to FIG. 5, a method 500 of operating a sensing structure for sensing a biological cell in a fluid, such as the sensing structure 101 of FIG. 1 and the sensing structure 201 of FIG. 2, is provided. The method 500 includes arranging sensors in an array along a single path (block 501), calibrating the sensors over a range of operating frequencies (block 502), obtaining a baseline reactance of each of the sensors (block 503), flowing the fluid through the sensors in the array and along the single path (block 504), obtaining a testing reactance of each of the sensors during the flowing of the fluid (block 505) and determining whether a difference between the baseline reactance and the testing reactance of each of the sensors exists and is indicative of a presence of the biological cell (block 506). The obtaining of the baseline reactance and the obtaining of the testing reactance of blocks 503 and 505 can each include obtaining a capacitance of each of the sensors or, alternatively, the obtaining of the baseline reactance and the obtaining of the testing reactance of blocks 503 and 505 can each include obtaining an inductance of each of the sensors. The obtaining of the baseline reactance of block 503 can include obtaining a first reactance of each of the sensors in an empty condition (block 5031) and obtaining a second reactance of each of the sensors during a flowing of the fluid without any biological cell (block 5032). As will be described below with reference to FIG. 6, the obtaining of the testing reactance of each of the sensors of block 505 can include continuing the obtaining of block 505 in an event of one or more of a statistically significant number of the biological cell is not detected, data analytics does not detect a sufficient number of detection and identification events and a judgment that neural network training is not complete. In accordance with one or more embodiments of the present invention, the method 500 can further include training neural network models to identify different types of the biological cell (block 507).

Figure 6:
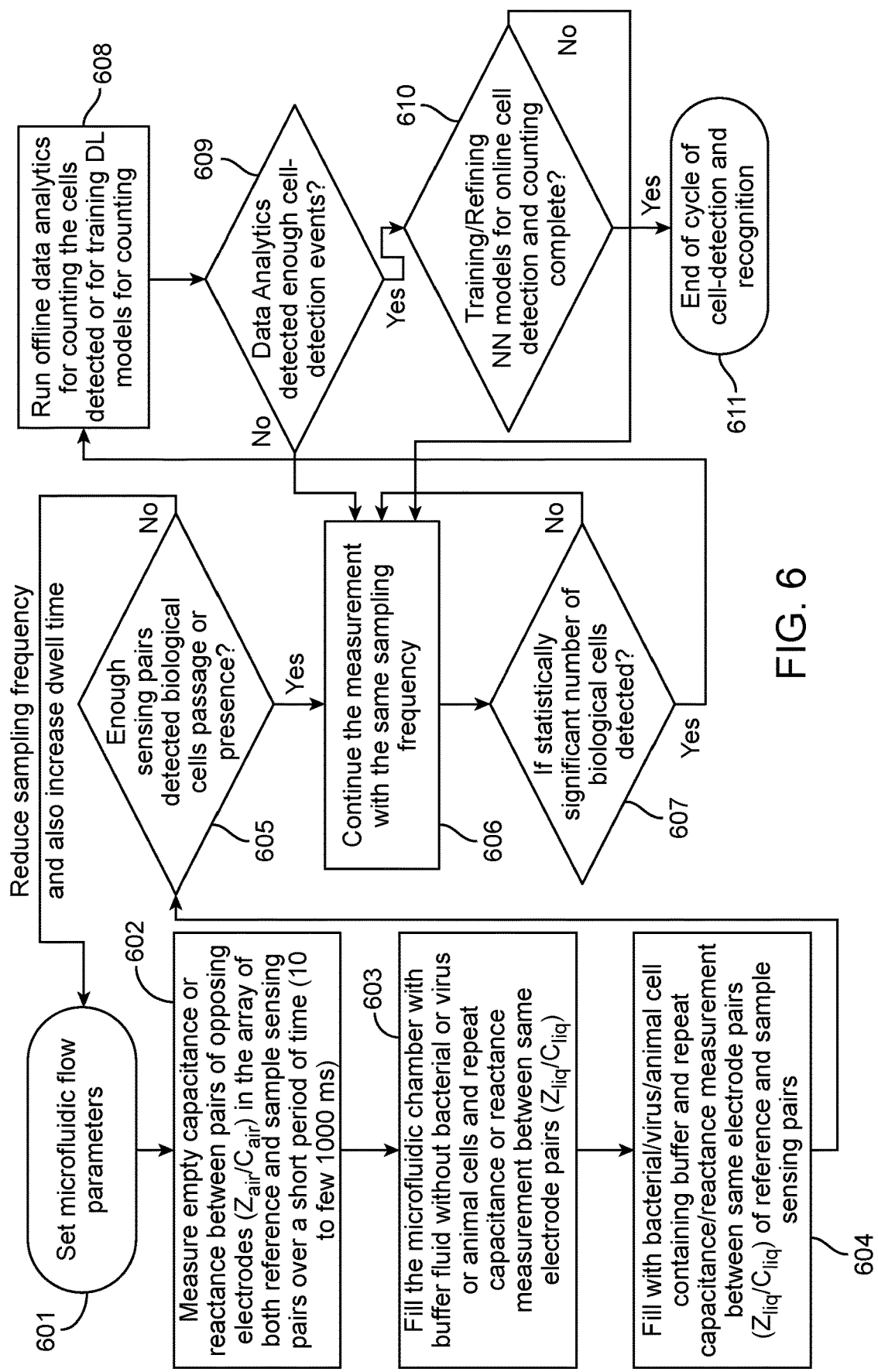
FIG. 6 is a flow diagram illustrating a method of building a sensing structure in accordance with one or more embodiments of the present invention.

With continued reference to FIG. 5 and with additional reference to FIG. 6, the method 500 of FIG. 5 will now be described in greater detail. As shown in FIG. 6, microfluidic parameters are set at block 601. Then, an empty capacitance or reactance between pairs of opposing electrodes ($Z_{air}$/$C_{air}$) in the array of both reference and sample sensing pairs are measured over a short period of time (10 to a few 1000 ms) and over a range of frequencies (preferably 0.1 to 100 MHz) to obtain a first dielectric constant (block 602) and the microfluidic chamber is filled with buffer fluid without bacterial or virus or animal cells and the capacitance or reactance measurement between same electrode pairs ($Z_{liq}$d/$C_{liq}$) over same frequency ranges are repeated to obtain a second dielectric constant (block 603) which is reflective of the dielectric constant of the buffer liquid. Next, the buffer liquid is filled with bacterial/virus/animal cells containing buffer and the capacitance or reactance measurement between same electrode pairs ($Z_{liq}$/$C_{liq}$) of reference and sample sensing pairs is repeated to obtain a dielectric constant of the bacterial/virus/animal cells (block 604).

At this point, it is determined whether a sufficient number of sensing pairs detected biological cell passage or presence (block 605). If not, control reverts back to block 601 with a commensurate reduction in sampling frequency and/or increased dwell time. If so, control proceeds to continuing the measurement with a same sampling frequency (block 606) and it is determined whether a statistically significant number of biological cells has been detected (block 607). If not, control reverts to block 606. If so, control proceeds to running offline data analytics for counting the biological cells that have been detected or for training models for counting (block 608).

Next, it is determined whether data analytics suggests that there have been sufficient cell-detection and identification events (block 609). If not, control reverts to block 606. If so, control proceeds determining whether training and/or refining of neural network models for online cell counting and type identification has been completed (block 610). If not, control reverts to block 606. If so, control proceeds to ending the cycle of cell-detection and recognition (block 611).

Figure 7A:
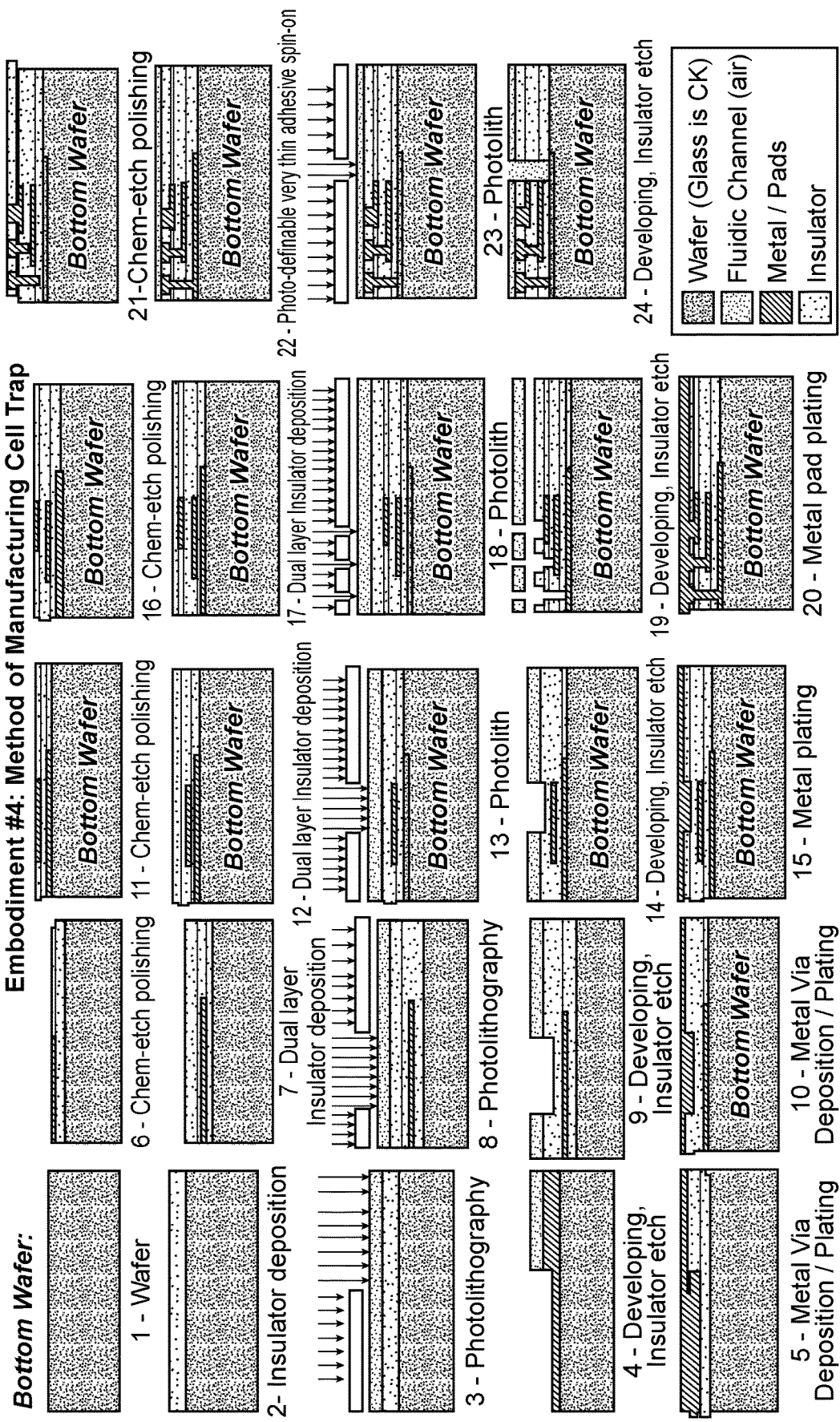
FIGS. 7A and 7B are graphical flow diagrams illustrating a method of fabricating the sensing structure of FIGS. 2-4 in accordance with one or more embodiments of the present invention.
Figure 7B:
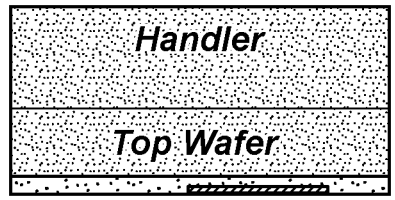
Figure 7B:
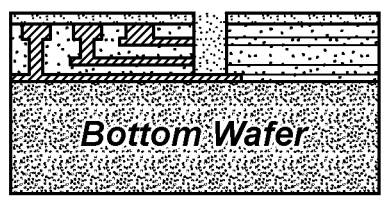
Figure 7B:
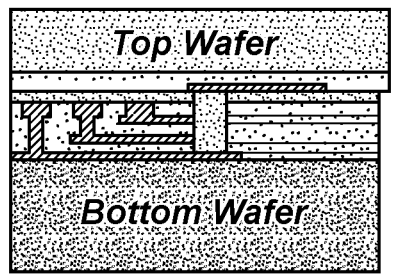
Figure 7B:
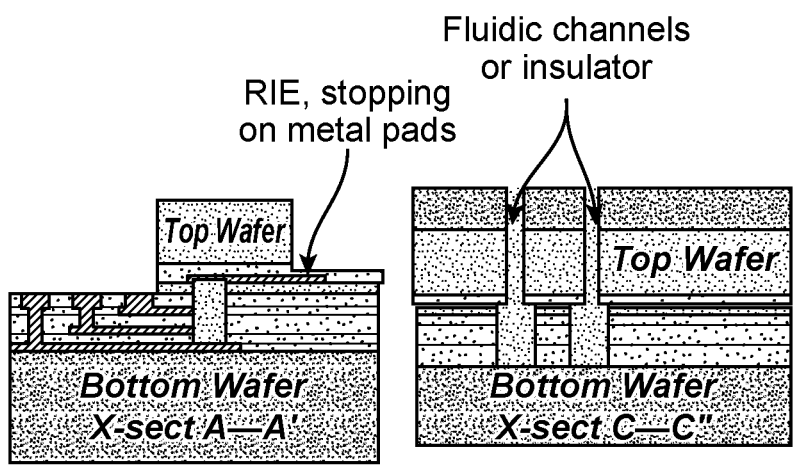

With reference to FIGS. 7A and 7B, a method of fabricating the sensing structure 201 of at least FIGS. 2-4 is provided. As shown in FIG. 7A, the method includes operations 1-4 in which layers of dielectric material are deposited and etched over a wafer, operations 5-23 in which pads, probe tips and metallization of multiple probes are formed in the layers of dielectric material and operation 24 in which a channel is formed with which the probe tips are each communicative. As shown in FIG. 7B, the method further includes formation of a top wafer with an additional probe that is disposed over the channel.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A sensing structure, comprising: a channel through which a fluid is flowable along a single path, the channel being defined in insulator layers between top and bottom wafers such that the channel is encompassed at upper and lower sides thereof and at opposite lateral sides thereof by the insulator layers; an array of sensors disposed along a length of the channel whereby the fluid is flowable through each of the sensors; and sensing circuitry, which extends into the channel and which is electrically connected with each of the sensors, the sensing circuitry being configured to measure a reactance of each of the sensors and to determine whether any reactance is indicative of a presence of a biological cell in the fluid flowing through the corresponding sensors.

2. The sensing structure according to claim 1, wherein each sensors comprises opposed electrodes on opposite sides of the channel.

3. The sensing structure according to claim 1, wherein three or more sensors are disposed along the length of the channel.

4. The sensing structure according to claim 1, the sensors are arranged at uniform intervals along the length of the channel.

5. The sensing structure according to claim 1, wherein the sensing circuitry is configured to measure at least one of capacitances and inductances across the array of the sensors.

6. The sensing structure according to claim 1, wherein the sensing circuitry is configured to measure at least one of a capacitance and an inductance of each one of the sensors.

7. The sensing structure according to claim 1, wherein, for when the fluid has an absence of the biological cell and when the fluid has the biological cell, the sensing circuitry is controllable to obtain a dielectric constant of the fluid over a range of operating frequencies.

8. The sensing structure according to claim 7, wherein the array of the sensors and the sensing circuitry is calibrated by obtaining the dielectric constant of the fluid over the range of operating frequencies for when the fluid has only one type of the biological cell.

9. A sensing structure, comprising:
a bottom wafer;
a top wafer;
insulator layers interposed between the bottom wafer and the top wafer and formed to define a channel, which is encompassed at upper and lower sides thereof and at opposite lateral sides thereof by the insulator layers, and along which fluid is flowable along a single path;
sensors disposed along a length of the channel whereby the fluid is flowable through each of the sensors; and
sensing circuitry, which extends into the channel and which is electrically connected with each of the sensors, the sensing circuitry being configured to measure at least one of capacitances and inductances of each of the sensors and to determine whether any of the at least one of the capacitances and the inductances indicate a presence of a biological cell in the fluid flowing through the corresponding sensors.

10. The sensing structure according to claim 9, wherein the sensors comprise reference sensors and sample sensors interleaved along the length of the channel.

11. The sensing structure according to claim 10, wherein each of the sensors comprises pairs of ground-signal-ground (GSG) electrodes on opposite sides of the channel.

12. The sensing structure according to claim 10, wherein the sensing circuitry comprises probes, each probe comprising:
   a pad exposed to an exterior;
   probe tips disposed in the channel and in electrical contact with corresponding ones of the reference sensors and the sample sensors; and
   metallization that extends through the insulator layers between the pad and each of the probe tips.

13. The sensing structure according to claim 12, wherein the probe tips of each probe are disposed in electrical contact with adjacent ones of the reference sensors and the sample sensors.

14. The sensing structure according to claim 12, wherein pairs of probes have overlapping probe tips.

15. A method of operating a sensing structure for sensing a biological cell in a fluid, the method comprising:
   defining a channel in insulator layers between top and bottom wafers such that the channel is encompassed at upper and lower sides thereof and at opposite lateral sides thereof by the insulator layers;
   arranging sensors in an array along the channel;
   disposing probe tips in the channel and in electrical contact corresponding ones of the sensors;
   extending metallization from the probe tips to pads exposed at an exterior of the insulator layers and the top and bottom wafers;
   obtaining a baseline reactance of each of the sensors;
   flowing the fluid through the sensors in the array and along the channel;
   obtaining a testing reactance of each of the sensors during the flowing of the fluid; and
   determining whether a difference between the baseline reactance and the testing reactance of each of the sensors exists and is indicative of a presence of the biological cell.

16. The method according to claim 15, wherein:
   the obtaining of the baseline reactance and the obtaining of the testing reactance each comprise obtaining a capacitance of each of the sensors, and
   the obtaining of the baseline reactance and the obtaining of the testing reactance each comprise obtaining an inductance of each of the sensors.

17. The method according to claim 15, further comprising calibrating the sensors over a range of operating frequencies.

18. The method according to claim 15, wherein the obtaining of the baseline reactance comprises:
   obtaining a first reactance of each of the sensors in an empty condition; and
   obtaining a second reactance of each of the sensors during a flowing of the fluid with an absence of the biological cell.

19. The method according to claim 15, wherein the obtaining of the testing reactance of each of the sensors comprises continuing the obtaining in an event of one or more of a statistically significant number of the biological cell is not detected, data analytics does not detect a sufficient number of detection and identification events and a judgment that neural network training is not complete.

20. The method according to claim 15, further comprising training neural network models to identify different types of the biological cell.

* * * * *